April 10, 1934.  H. F. KRUG  1,954,179
COMBINED VELOCIPEDE, CART, AND TRACTOR TRAILER
Filed Nov. 25, 1932
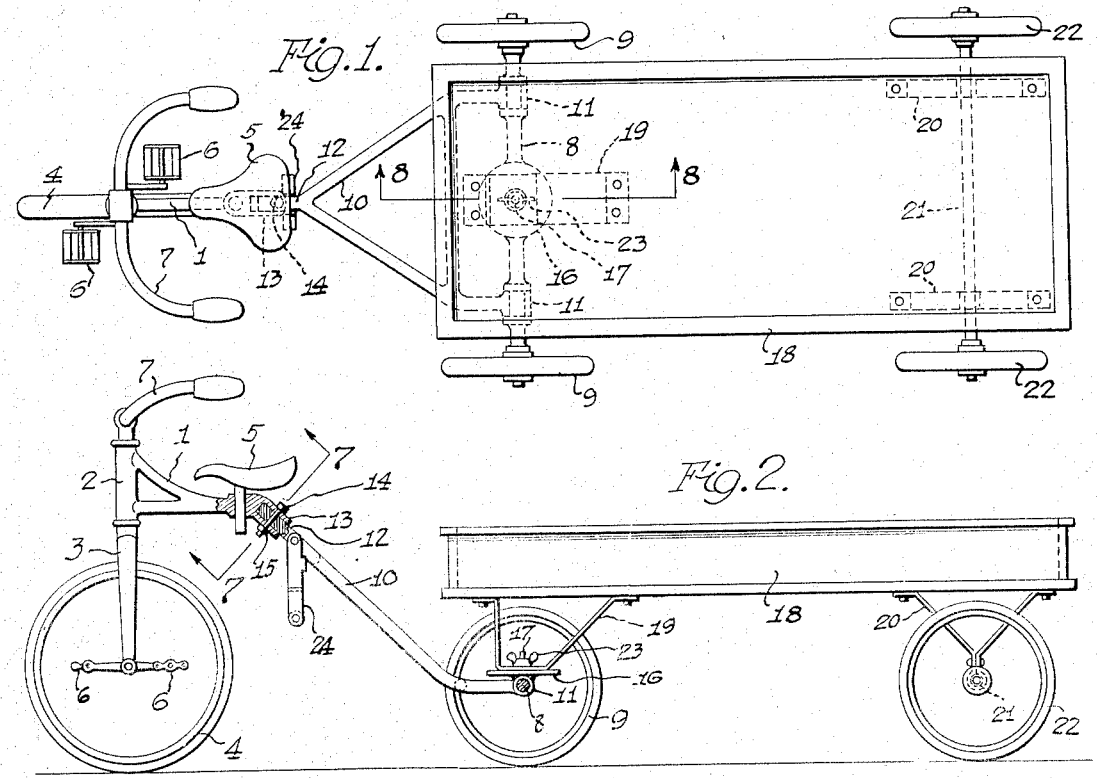
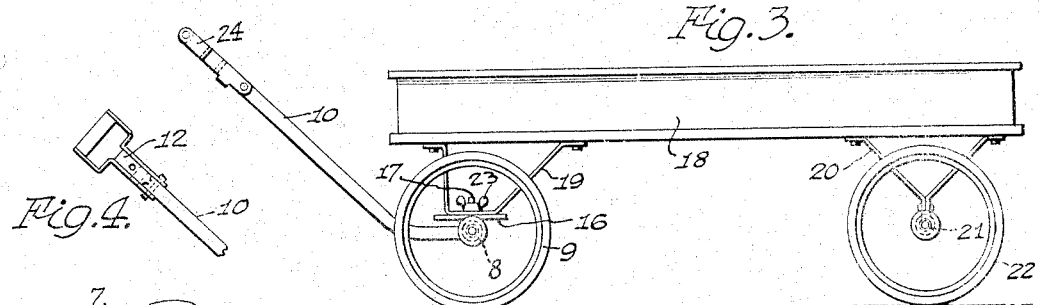
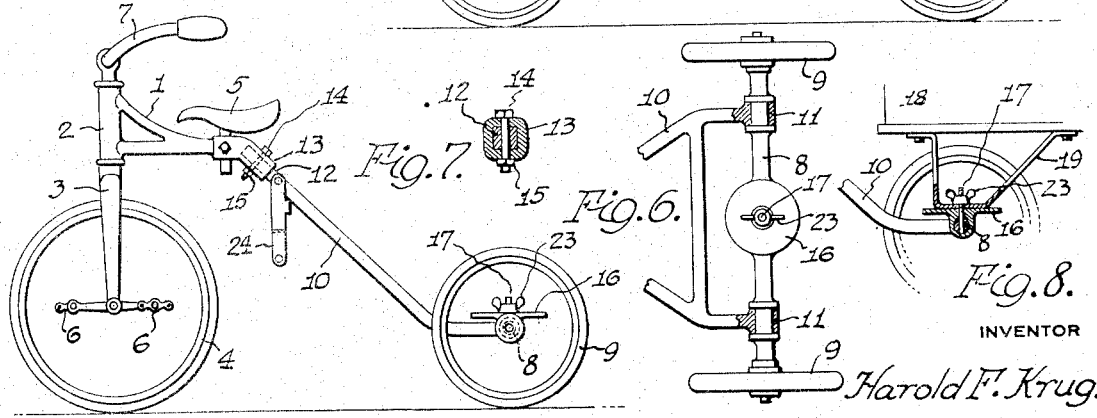
INVENTOR
Harold F. Krug.
BY
ATTORNEYS Patented Apr. 10, 1934

1,954,179

UNITED STATES PATENT OFFICE 1,954,179

COMBINED VELOCIPEDE, CART, AND TRACTOR-TRAILER

Harold F. Krug, Grosse Pointe Park, Mich.

Application November 25, 1932, Serial No. 644,185

2 Claims. (Cl. 208—45)

The present invention pertains to a novel combination of toy parts which may be variously assembled to constitute either a velocipede, a cart or a tractor-trailer. The principal object of the invention is to provide such a combination of parts which are simple and inexpensive in construction and which may readily and easily be taken apart and reassembled for the purposes set forth.

The device may be conceived as a velocipede or tricycle separable at a point immediately behind the seat into two parts. One of these parts embodies the main frame with the front wheel, handle-bars and seat, and the other part is the inclined strut carried by the rear axle with the two rear wheels.

The third and remaining part is a cart or trailer comprising a body having a rear axle and rear wheels and at its front end a suspended bracket adapted to be detachably secured to the aforementioned rear axle of the tricycle. The trailer member attached to the tricycle in this manner constitutes a tractor-trailer wherein the propulsion mechanism of the tricycle is the tractor, and the cart is the trailer.

On separating the parts at the joint behind the seat of the tricycle, the cart body rests on four wheels, including the formerly rear wheels of the tricycle which now become the front wheels of the cart. The member previously described as the inclined strut of the tricycle leading to the rear wheels becomes the draft tongue of the cart.

The invention is fully disclosed by way of example in the following description and in the accompanying drawing, in which—

Figure 1 is a plan view of the complete axle as a tractor-trailer;

Fig. 2 is a side elevation thereof, partly in section;

Fig. 3 is a side elevation of the cart assembly;

Fig. 4 is a detail plan view of the handle thereof;

Fig. 5 is a side elevation of the tricycle assembly;

Fig. 6 is a detail plan view, partly in section, of the rear axle thereof;

Fig. 7 is a section on the line 7—7 of Figure 2; and

Fig. 8 is a detail section, partly in elevation, approximately on the line 8—8 of Figure 1.

Reference to these views will now be made by use of like characters which are employed to designate corresponding parts throughout.

In Figures 1, 2 and 5 is illustrated the main frame 1 of a tricycle having at its forward end a vertical head or bearing 2 in which is journalled a fork 3 in the usual manner. The fork extends downwardly and has a single wheel 4 journalled between the bifurcations thereof.

In the rear part of the frame 1 is mounted a seat 5. To the center of the wheel are secured pedals 6 at opposite sides thereof and within reach of a person occupying the seat 5. The upper end of the fork above the head 2 carries handle-bars 7 also within reach of the occupant of the seat 5. The structure thus far described is more or less common to tricycles, except for the rear wheel structure which will now be described.

The rear wheel assembly for the tricycle is shown more clearly in Figures 5 and 6 and includes an axle 8 with wheels 9 journalled on the ends thereof. A substantially triangular tongue or strut 10 journalled on the axle 8 as indicated by the numeral 11, and its vertex is formed with a vertically extending stem 12 which appears in Figures 1, 2 and 5. The rear end of the frame 1 is formed with a socket 13 receiving the stem 12, and these parts are secured together by a bolt 14 passed therethrough and having a nut 15 on its threaded end as shown more clearly in Figure 7. The assembly shown in Figures 5 and 6 forms a three-wheeled velocipede with its rear end portion separable at the socket 13.

A clamping plate 16 is mounted horizontally upon the axle 8 and is held thereto by a pin 17 as shown in Figure 8. There is also provided a trailer cart comprising a body 18 with a single depending bracket 19 at its forward end and a pair of transversely aligned brackets 20 at its rear end. The latter support a rear axle 21 carrying a pair of wheels 22 at its ends, and the bracket 19 is adapted to rest upon the plate 16 and over the pin 17 as shown in Figure 8. A wing-nut 23 screwed on the upper free end of the pin 17 secures the cart to the axle 8. In this condition, the device appears as in Figures 1 and 2 wherein the cart is in the form of a trailer attached to the rear axle of the tricycle as a tractor.

A toy wagon or cart may be obtained by separating the forward tractor unit at the bolt 14, whereupon the member 10 becomes the draft tongue of the wagon as shown in Figure 3. A handle 24 is pivotally attached to the forward or upper end of the member 10 for more easily dragging the cart. However, when the member 10 is secured to the frame 1 in the tricycle of Figure 5 or in the tractor-trailer combination, Figure 2, the handle 24 merely hangs loosely as illustrated.

It will now be evident that the combination of parts shown and described herein may be assembled for three different toy devices, namely a tricycle as in Figure 5, a tractor-trailer combination as in Figures 1 and 2, and a hand-drawn cart as in Figure 3. The draft tongue 10 is common to all three assemblies, while the axle 8 serves in one case as the rear axle of the tricycle and in another case as the front axle of the cart.

Although a specific embodiment of the invention has been illustrated and described it will be understood that various alternations in the details of construction may be made without departing from the scope of the invention, as indicated by the appended claims.

What I claim is:—

1. A combined four-wheeled wagon and tricycle, said wagon comprising a box and two axles, said tricycle comprising a dirigible wheel rotatably journalled in a two part frame, one of the parts of said frame being permamently connected to one of said axles, detachable means for connecting said mentioned axle to said box, means permamently connecting the other axle to said box, and means for detachably connecting the two parts of said tricycle frame whereby said frame part which is connected to said axle may be disconnected from the other part to serve as a tongue for said wagon.

2. In combination, a tricycle frame having a seat thereon, a dirigible wheel with pedals thereon, an axle having wheels rotatably journalled on the ends thereof, a triangularly shaped member pivotally connected to said axle, detachable means for rigidly connecting the end of said triangularly shaped member to said frame, means for removably connecting a wagon box to said axle, said wagon box being adapted to be removed to permit use of the device as a tricycle, and said triangular member being adapted to be removed from said frame to serve as a tongue on said axle when said wagon box is attached thereto.

HAROLD F. KRUG.